US006216111B1

(12) United States Patent
Walker et al.

(10) Patent No.: US 6,216,111 B1
(45) Date of Patent: Apr. 10, 2001

(54) SYSTEM AND METHOD FOR TELEMARKETING PRESENTATIONS

(75) Inventors: Jay S. Walker, Ridgefield; James A. Jorasch, Stamford, both of CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

(21) Appl. No.: 08/820,499

(22) Filed: Mar. 19, 1997

(51) Int. Cl.[7] ............................. G06F 17/60; H04M 11/00
(52) U.S. Cl. .............................................. 705/14; 379/93.12
(58) Field of Search .................................... 705/14, 7, 10; 379/67.1, 68, 70, 69, 74, 88.01, 88.04, 88.16, 88.19, 88.2, 88.21, 88.22, 93.01, 93.12; 348/13, 1, 2, 3

(56) References Cited

U.S. PATENT DOCUMENTS

| | | | |
|---|---|---|---|
| 4,850,007 | * 7/1989 | Marino et al. | 379/88.2 |
| 4,876,592 | 10/1989 | Kohorn | 348/13 |
| 5,025,372 | 6/1991 | Burton et al. | 705/35 |
| 5,034,807 | 7/1991 | Von Kohorn | 348/13 |
| 5,103,449 | 4/1992 | Jolissaint | 370/384 |
| 5,181,744 | 1/1993 | Betheil | 283/56 |
| 5,333,186 | 7/1994 | Gupta | 379/201 |
| 5,345,501 | 9/1994 | Shelton | 379/88.2 |
| 5,448,625 | 9/1995 | Lederman | 379/88.25 |
| 5,499,289 | 3/1996 | Bruno et al. | 379/220 |
| 5,513,117 | * 4/1996 | Small | 364/479.03 |
| 5,515,424 | 5/1996 | Kenney | 379/93.22 |
| 5,537,314 | 7/1996 | Kanter | 705/14 |
| 5,553,120 | 9/1996 | Katz | 379/88.09 |
| 5,576,951 | 11/1996 | Lockwood | 705/27 |
| 5,619,558 | 4/1997 | Jheeta | 379/92.01 |
| 5,794,210 | * 8/1998 | Goldhaber et al. | 705/14 |
| 5,855,008 | * 12/1998 | Goldhaber et al. | 705/14 |

FOREIGN PATENT DOCUMENTS

2345172 * 6/2000 (GB) ............................. G06F/17/60

OTHER PUBLICATIONS

Dial–A–Game Puts Callers in 'Jeopardy!' Orlando Sentinel Tribune, Jul. 9, 1990.
"Putting Lock on 900–Numbers May Prevent Expensive Charge Kentucky", The Courier–Journal, Feb. 18, 1991.
Volk, David "This Phone Call Sponsored By Romio's Pizza" American Demographics, May 1993.
Hughes, Arther Middleton "Database Marketing and the One–To–One Future" DM News, Aug. 15, 1994.
Cruz, Humerberto "Credit Cards' Repayment Offer a Certified Lemon" Milwaukee Journal Sentinel, Jan. 7, 1996.
Anonymous, Dialog file 16 (Gale Group PROMT(R)), No. 3992988, "M7T Bank and Price Chopper Join to introduce Credit Card; Offers Rebates Towards Groceries with no Annual Fees", PR Newswire, 2 pages Sep. 1995.*
Anonymous, "Marketing minutes, Wells Fargo Touts 24–hour service, $24 cash", Bank Advertising News, pp. 1, 8 Feb. 1988.*

* cited by examiner

*Primary Examiner*—Stephen R. Tkacs
(74) *Attorney, Agent, or Firm*—Fitzpatrick, Cella, Harper & Scinto; Patrick J. Buckley

(57) ABSTRACT

A system is described whereby a telemarketer may reward a customer during the telemarketing call, thereby providing the customer with an incentive to listen to the telephone sales presentation. An invitation is communicated to a consumer regarding an opportunity to receive a sales presentation in exchange for a value. The invention includes a controller including a CPU and a memory device; the memory device contains the sales presentation and contains a program for delivering the sales presentation to the consumer. The invention also includes an apparatus for communicating the sales presentation to the consumer in response to the consumer accepting the invitation. The program is further adapted to initiate a transfer of the value to the consumer in response to the consumer receiving the sales presentation.

48 Claims, 9 Drawing Sheets

← 211

| QUESTION IDENTIFICATION NUMBER 301 | QUESTION 302 | ANSWER 303 |
|---|---|---|
| | | |
| | | |
| | | |

| SALES PRESENTATION IDENTIFICATION NUMBER 401 | SALES PRESENTATION 402 | QUESTION IDENTIFICATION NUMBERS 403 | VALUE PER CORRECT ANSWER 404 |
|---|---|---|---|
|  |  |  |  |
|  |  |  |  |
|  |  |  |  |

| CREDIT CARD NUMBER 401 | CUSTOMER NAME 402 | PRESENTATION IDENTIFICATION NUMBER 403 | CREDIT AMOUNT AWARDED 404 |
|---|---|---|---|
|  |  |  |  |
|  |  |  |  |
|  |  |  |  |

| CREDIT CARD NUMBER 451 | AMOUNT OF PURCHASES 452 | CATEGORY OF PURCHASES 453 | CREDIT LINE 454 |
|---|---|---|---|
| | | | |
| | | | |
| | | | |

FIG. 4B

SYSTEM AND METHOD FOR TELEMARKETING PRESENTATIONS

BACKGROUND OF THE INVENTION

The present invention relates to systems and methods for telemarketing, and particularly to telemarketing systems and methods for providing an incentive for prospective customers to listen to a telemarketing sales presentation.

Offering a prospective customer a reward for listening to a sales presentation is a very well known practice. When the salesperson and prospect meet face to face, the reward can be offered and accepted, and the presentation can be made as part of the same transaction. A typical example is to invite a prospect to a seminar on financial planning, coupled with an offer of free merchandise or services if the prospect attends.

With the advent of telemarketing (selling over the telephone), the salesperson and prospect need no longer meet face to face; indeed, the sales presentation may advantageously be pre-recorded. The use of pre-recorded sales presentations is very efficient, since a live salesperson is not necessary for each call to a prospect. Telemarketing, both with live salespersons and pre-recorded presentations, is used by a wide variety of organizations, both profitable and charitable, to solicit business and donations.

If a telemarketing presentation is successful, there are various options available to the telemarketing organization for the customer to make payment. For example, in the course of a live presentation, the salesperson can obtain the customer's name and address, and the telemarketing organization can then follow with a mailed invoice. The received name and address in this case can also be used as the destination of the merchandise or services purchased. A more efficient alternative, from the standpoint of revenue collection, is to bill the customer's credit card account. Thus in the case of a live presentation, the salesperson can request the prospect's credit card number in addition to his name and address. If a pre-recorded presentation is used, the customer may enter his credit card number via the touch-tone pad of his telephone. If the product or service is sold by a credit card issuer, the issuer will already have the customer's credit card number, name and address; this information then need not be provided at the time of the order.

A system of distributed telecommunications for telemarketing is disclosed in U.S. Pat. No. 5,499,289, in which telemarketing agents use a plurality of distributed system nodes but each accesses a database resident on a central system controller. The agents obtain from the database calling lists and scripts to use in conversing with the called party. The agents may thus be remotely located from the system center while the system maintains control of the calling list and other valuable information. A system for composing individualized sales presentations is disclosed in U.S. Pat. No. 5,576,951; in this patent, a hierarchy of data sources is searched to permit the marketer to compose a customized sales presentation for use with a particular called party. U.S. Pat. No. 5,537,314 describes an incentive program applicable to a network marketing (or "multi-level" marketing) system in which participants accumulate credit and/or awards posted to their individual accounts. These awards are offered by sponsoring companies to motivate participants to refer others to those companies. Such an incentive program is directed to the participants already recruited by the sponsoring companies, as opposed to a large group of unreached potential customers desired by a telemarketer.

A variation of telemarketing involves interactive voice response units (IVRUs). In a system based on an IVRU, a customer may receive pre-recorded answers to his questions, or may answer questions in a multiple-choice format without the need for a live operator to evaluate the results.

A telephonic-interface system is described in U.S. Pat. No. 5,553,120 in which a voice generator prompts an individual caller for digital responses. This data may be used in a game, contest, lottery or the like, with award points credited to the caller for correct answers. A telephone version of a television game show has been reported, wherein callers entering correct answers qualify for cash prizes.

A known problem with telemarketing is the difficulty of motivating a prospective customer to listen to a telemarketing sales presentation. Even where outbound pre-recorded telemarketing messages are permitted by law, the prospect often hangs up after realizing that the telephone call he or she has just answered is a pre-recorded telemarketing message. Furthermore, the absence of live contact makes it difficult for the telemarketer to efficiently reward the prospect for listening to the presentation.

Telemarketers have tried to overcome this sales resistance by offering prizes to called parties. For example, if the called party agrees to attend an in-person sales presentation, he may be given a prize when he comes to that presentation. Alternatively, prizes have been offered to induce persons to call a "900" number (for which generally the caller is billed) to listen to a live or recorded sales presentation. Sometimes the prospective customer is not aware he is being charged for the 900-number call when he places the call, and is dissatisfied when he learns of the charge. A system has also been reported wherein subscribers are given cash rebates for listening to advertisements while making outgoing calls. For example, a subscriber waiting for his call to be connected listens to a five-second recorded message, and may choose to listen to a longer message. The system may be programmed to play a particular advertisement based on the number called; for example, if a subscriber calls a business, he may hear an advertisement for that business's competitor. This reported system involves playing advertisements only, as opposed to concluding sales of goods or services over the telephone.

In the above-described examples, the prospective customer listening to the sales presentation or advertisement on the telephone is not rewarded immediately; the reward, if any, is instead given later in person or by mail. This makes it difficult for the telemarketer to attract and hold the prospective customer's attention. In the case of recorded sales presentations, the telemarketer cannot verify that the called party is listening, even if the call proceeds to its conclusion.

SUMMARY OF THE INVENTION

The present invention solves the above-described problems by providing a system whereby a telemarketer may reward a customer during the telemarketing call, thereby providing the customer with an incentive to listen to the telephone sales presentation. The present invention also provides a system for rewarding the customer for accepting an offer made in a telemarketing sales presentation.

In our invention, an invitation is communicated to a consumer regarding an opportunity to receive a sales presentation in exchange for a value. The invention comprises a controller including a CPU and a memory device; the memory device contains the sales presentation and contains a program, adapted to be executed by the CPU, for delivering the sales presentation to the consumer. The invention also includes an apparatus, connected to and controlled by the CPU, for communicating the sales presentation to the consumer in response to the consumer accepting the invitation. In addition, the program is further adapted to initiate a transfer of the value to the consumer in response to the consumer receiving the sales presentation.

More generally, our invention comprises a system which identifies a remotely located consumer, delivers information to the consumer, receives a response from the consumer, and initiates a transfer of a value to the consumer during delivery of the information.

An additional feature of this invention is that the sales presentation is delivered to the customer in the course of a telephone call. The telephone call may be either incoming (placed by the customer) or outgoing (placed by the telemarketer). The customer is given a monetary credit on his credit card as a reward for listening to the sales presentation.

In the practice of our invention, the customer may answer questions related to the telephone sales presentation, and then receive a reward based on those answers. The customer's responses can be used to verify that he is indeed listening to the sales presentation.

Another feature of our invention is that the customer is offered goods or services in the course of a telemarketing call, and receives an immediate reward for accepting the offer.

An additional feature of our invention is a computer readable medium which stores computer readable codes to be executed by a computer. The computer readable codes perform a method comprising the steps of receiving a communication from a consumer; querying the consumer for identifying information; receiving a response from the consumer; searching a customer database and a sales presentation database in accordance with the identifying information; selecting a sales presentation to be delivered to the consumer; delivering the sales presentation to the consumer; and initiating a transfer of value to the consumer.

As will be appreciated from a consideration of the detailed description set out below, the present invention represents a significant advancement over the prior art by providing a method and apparatus for supporting telemarketing which has the following advantages, amongst others: better targeting and attraction of qualified customers, more flexible and effective tailoring of both the presentation and rewards to the interests of the customer, the ability to provide immediate rewards and hence gratification to the customer, the ability to solicit real-time feedback from the customer indicating that he is listening to the information, and the ability to accelerate the reward and conclude the communication in an automated way should the customer decide to purchase offered goods or services.

BRIEF DESCRIPTION OF THE DRAWINGS

FIG. 3A and FIG. 3B depict the fields of the question database and sales presentation database, respectively.

FIG. 4A and FIG. 4B depict the fields of the customer database and transaction database, respectively.

DETAILED DESCRIPTION OF THE PREFERRED EMBODIMENTS

In the preferred embodiment of the present invention, the person to whom the sales presentation is made has an established credit card account.

Figure 1:
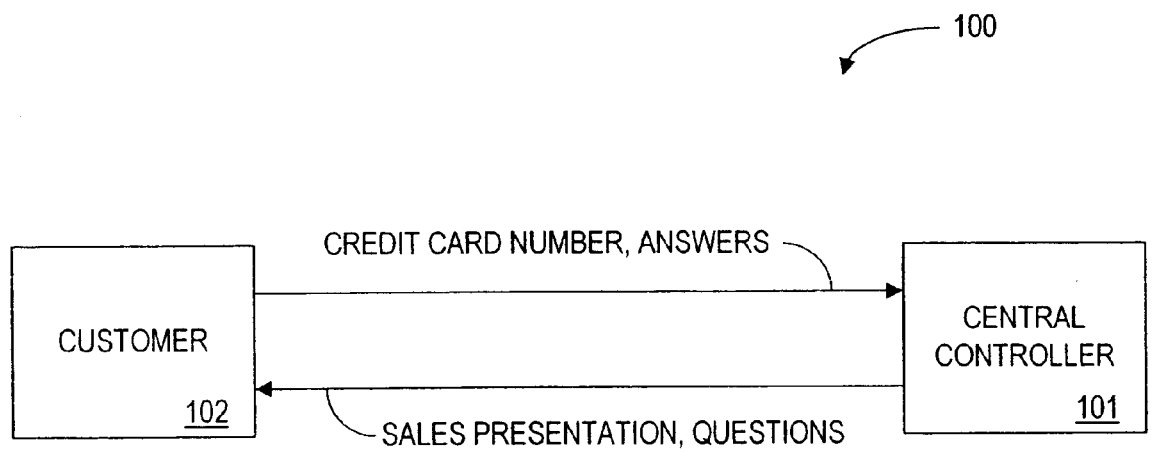
FIG. 1 is an overall schematic diagram of an embodiment of the present invention.

A system overview 100 is shown in FIG. 1. The embodiment generally involves an exchange of information between a central controller 101 and the customer 102. The system depicted in FIG. 1 may be embodied in hardware specifically provided to implement the present invention. Alternatively, the system may be implemented using hardware and communication equipment already installed by a telemarketer. Changes to an existing central controller to incorporate the present invention may be accomplished in various ways, such as reprogramming the controller or by adding databases to a data storage device. Alternatively, the present invention may be implemented using a telemarketer's existing hardware entirely, by making appropriate upgrades in the software.

Figure 2:
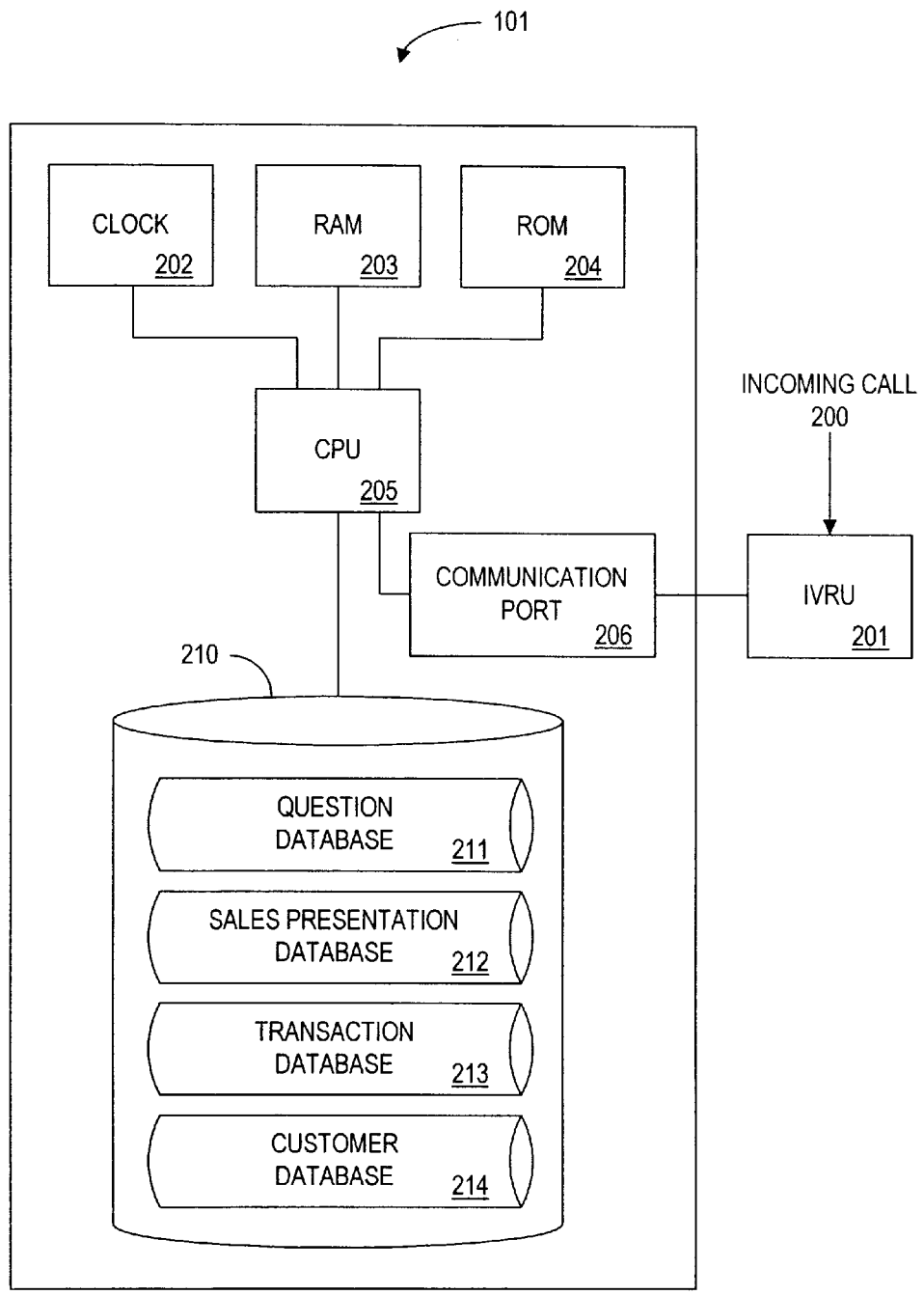
FIG. 2 is a block diagram of the central controller.

A schematic diagram of the central controller is shown in FIG. 2. An incoming call 200 is received by an interactive voice response unit (IVRU) 201 which is connected to the CPU 205 of the central controller through a communication port 206. The CPU performs the processing functions of the central controller. The CPU is connected to a clock circuit 202, a random-access memory (RAM) 203, a read-only memory (ROM) 204 and a data storage device 210. The ROM 204 is used to store at least some of the program instructions that are to be executed by the CPU 205, and the RAM 203 is used for the temporary storage of data. The clock circuit 202 provides a clock signal which is required by the CPU. The data storage device 210 includes databases which respectively hold questions to be directed to the customer (database 211), sales presentations (database 212), transaction information (database 213) and customer information (database 214).

The CPU 205 causes information to be retrieved from the data storage device 210 and temporarily stored in the PAM 203. The CPU 205, through the communication port 206, also causes the IVRU 201 to send audio signals to the customer based on the information stored in the RAM 203.

FIG. 3A shows in tabular form the fields in the question database 211. These include an identification number field 301 for each question, a question field 302 for each question, and an answer field 303 for the answer to each question. Similarly, FIG. 3B is a representation in tabular form of the fields in the sales presentation database 212. This database includes an identification number field 351 for each sales presentation, a sales presentation field 352 for each sales presentation, a field 353 for the identification numbers of the questions associated with a given sales presentation, and a value field 354 for the value associated with each correct answer to a question.

FIG. 4A is a representation in tabular form of the fields in the customer database 214. This database includes a credit card number field 401 for each customer, a name field 402 for each customer, a field 403 for the identification number of the sales presentation delivered to that customer, and a field 404 for the amount to be credited to that customer's account as a reward for his listening to the sales presentation and answering the associated questions. FIG. 4B shows in tabular form the fields in the transaction database 213. This database has a field 451 with the credit card number for each transaction, a field 452 for the amount of purchases in that transaction, a field 453 for the category of purchases and a field 454 with the credit line for that credit card number.

While FIGS. 3A and 3B depict separate databases, a single database, combining sales presentations and their associated questions, can be used instead. Similarly, while FIGS. 4A and 4B depict separate databases, a single database combining customer information and transaction information may be used.

It is also understood that these databases are exemplary and numerous modifications and alterations may be made by one of ordinary skill in the art without departing from the scope of our invention.

Figure 5:
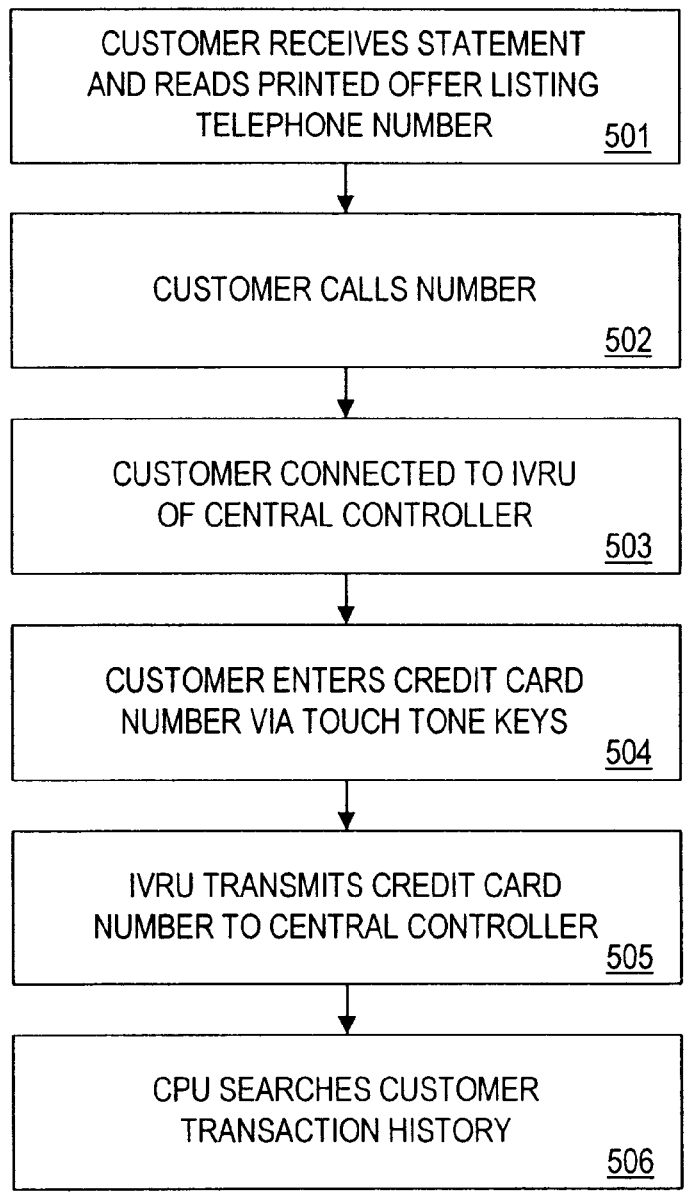
FIG. 5 is a flowchart describing initiation of a call according to an embodiment of the present invention.
Figure 6:
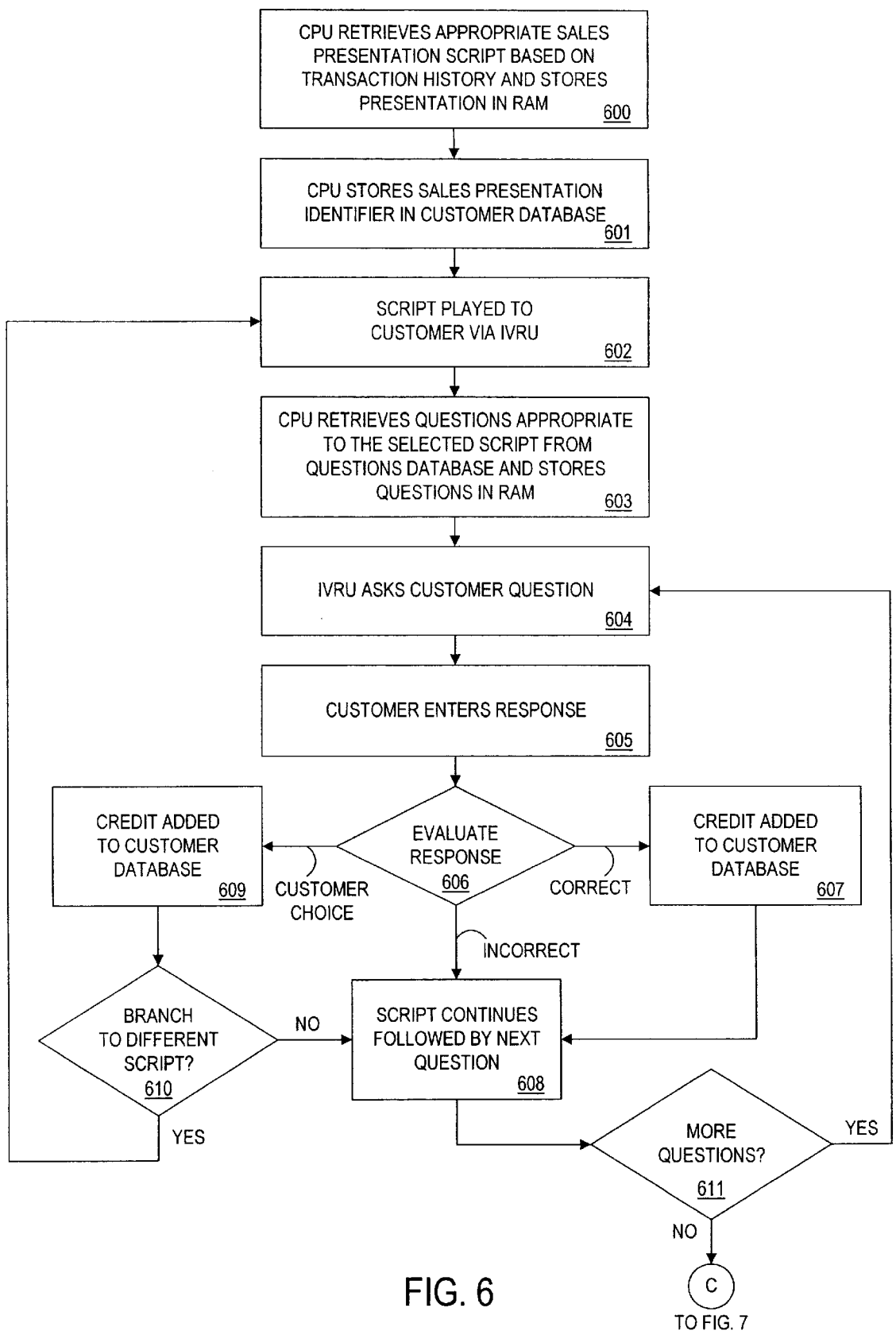
FIG. 6 is a flowchart describing delivery of a script and questions to a customer.
Figure 7:
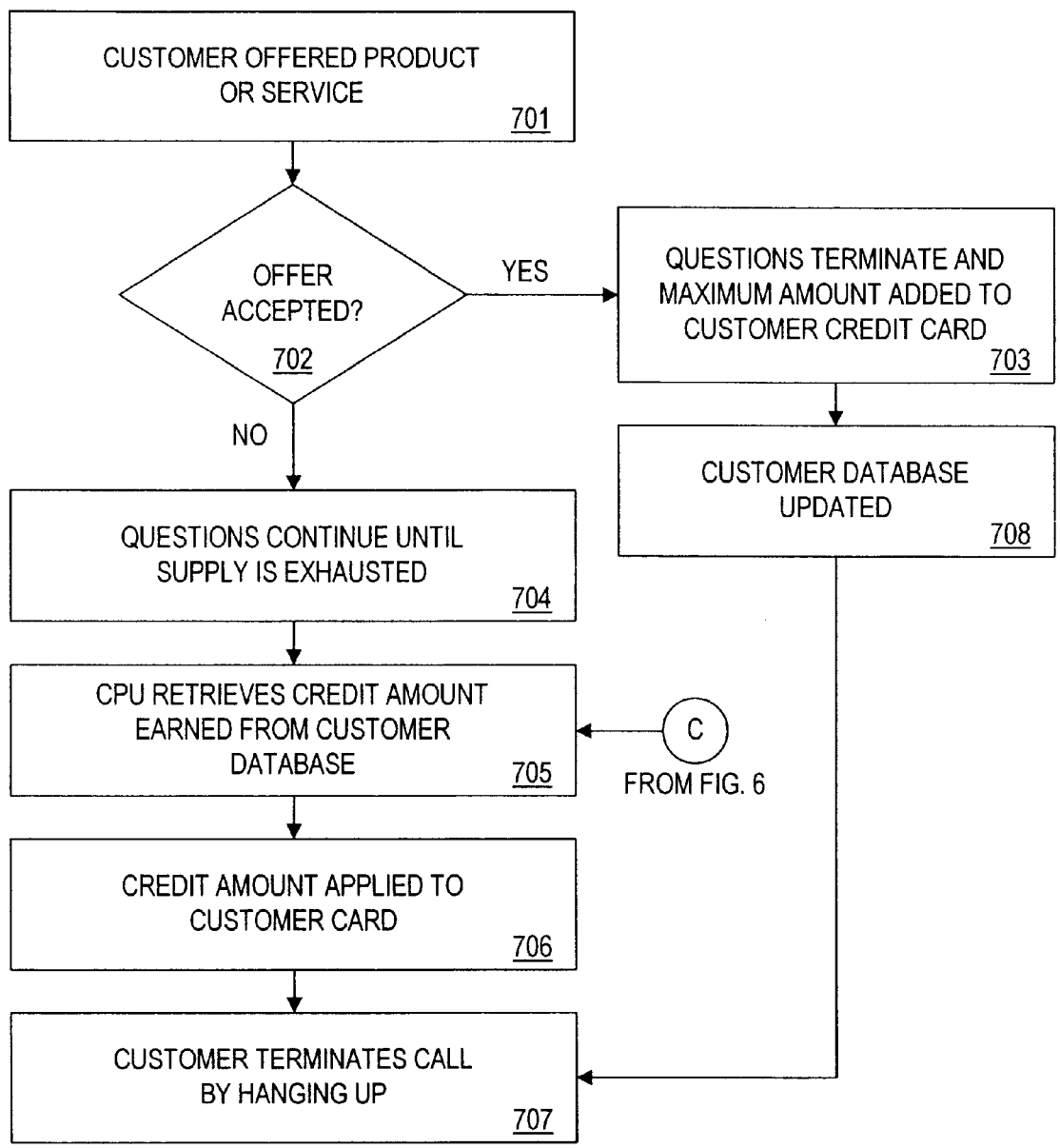
FIG. 7 is a flowchart describing termination of a call according to an embodiment of the present invention.

The steps of making a telemarketing sales presentation to a customer, and providing incentive to the customer according to this embodiment, are depicted in FIGS. 5, 6 and 7. The process starts with the customer receiving his monthly credit card statement, which contains an offer. The offer includes a telephone number to call, and indicates an award which the customer can earn simply by calling the telephone number, listening to a sales presentation and answering questions (FIG. 5, step 501). Alternatively, this offer can be extended to the customer through other advertising media (for example, a separate direct mail advertisement, a broadcast advertisement, electronic mail or the like).

In the steps described below, the CPU 205 executes a program stored in the ROM 204, using information temporarily stored in the RAM 203. The CPU controls the IVRU 201 and causes information to be retrieved from the storage device 210, stored in the RAM 203, and updated in the various databases.

When the customer places the call (step 502), he is connected to the IVRU 201 (step 503); the IVRU asks for his credit card number or other identifying information. The customer enters his credit card number via his telephone keypad (step 504). The IVRU transmits this information to the central controller (step 505). This information is stored in the RAM 203.

The CPU of the central controller uses this information to search the customer database 214 and the transaction database 213 for further information specific to the calling customer—for example, the customer's transaction history (step 506). The CPU then selects the most appropriate sales presentation script from the sales presentation database 212. This selection may be made in accordance with a number of criteria including the customer's name, address, income level, recent transactions, etc. The selected sales presentation is then stored in the RAM 203 (step 600). The CPU stores the presentation identification number in field 403 of the customer database 214, to indicate the particular script being played and to indicate for future reference that the customer has listened to that script (step 601).

The sales presentation is played to the customer through the IVRU (step 602). The central controller also retrieves questions appropriate to the selected script from the question database 211; these questions are then stored in the RAM 203 (step 603). The questions are presented to the customer through the IVRU (step 604). Preferably the questions are interspersed throughout the script, thus functioning as a check on whether the customer is paying attention to the sales presentation. The customer enters his response to each question via his telephone keypad (step 605). The CPU judges whether the customer's input corresponds to a correct answer (step 606). For each correct answer, the customer database 214 is updated to reflect a credit to be applied to the customer's credit card account (step 607). The script then continues to play until the next question (step 608). Alternatively, credit may be awarded only after the last question and only if all questions have been answered correctly.

In the practice of this invention, it is also possible for the questions not to have a correct or incorrect answer; they may instead ask for a choice or a free response on the part of the customer. For example, the customer may be asked a question relating to the content of the script that has just been played; if the customer answers correctly, this serves to verify that the customer is indeed listening to the sales presentation. A multiple-choice or free-response question, on the other hand, may elicit new information from the customer. For example, "Press 1 if you have taken a trip by air in the last month; if not, press 2," or, "Enter the number of trips you have taken by air in the last month." This new information may be used to modify the sales presentation. The customer is rewarded for giving an answer (step 609) and the script then may branch (step 610) to address the customer's needs more specifically, as explained in the example given below. The script may also branch in the event of an incorrect response, to give the customer a second chance to answer the question correctly.

In this embodiment, the sales presentation played to the customer through the IVRU includes an offer to sell a product or service (step 701). At any time during the call, the customer may indicate his acceptance of the offer (step 702). On acceptance of the offer (step 703) the questions terminate and the customer's credit card account is credited, and optionally in an amount in excess of the credit awarded for correct answers to questions without acceptance of the offer (e.g. a bonus for accepting the offer). The customer database 214 is then updated (step 708) and the customer then terminates the call (step 707). Alternatively, the customer could be transferred to a live operator upon indicating his willingness to accept the offer.

If the customer does not indicate his acceptance of the offer, the script continues to play and the questions continue to be presented, until no more questions remain for that particular script (step 704). The CPU retrieves from the customer database the amount which the customer earned during the course of the call (step 705); this amount is credited to the customer's credit card account (step 706). The customer terminates the call by hanging up (step 707). The customer may of course terminate the call during the sales presentation, in which case he may be credited only with the amount earned up to that point, or alternatively have his earnings canceled.

In the preferred embodiment of the invention, the sales presentation involves an offer of goods or services sold through, or in connection with, a credit card issuer. In that instance the customer (who already is a cardholder) need only identify himself via the IVRU to the extent necessary to obtain his records in the customer database 214. For example, the customer might enter the first four letters of his last name and his five-digit postal ZIP code. The customer need not give his full name, address and credit card number, which he might be reluctant to give over the telephone.

A specific example of an application of the present invention according to the preferred embodiment is as follows.

(1) A person holding a credit card issued by a bank receives his credit card statement. The statement advertises a $10 credit on his credit card if he calls the bank's toll-free telephone number and answers five questions during a six-minute presentation about credit card life insurance (i.e. insurance that pays any outstanding credit card balance on the death of the insured).

(2) The customer calls the bank's telephone number and reaches an IVRU-driven system as described generally above.

(3) The customer enters his credit card number using his telephone keypad.

(4) The customer's records in the bank's customer database and transaction database are accessed to select the most appropriate script for a sales presentation to be delivered to that customer. Selection of a script for a sales presentation on credit card life insurance might depend on the number of the customer's transactions, the presence in the transaction database of specific transactions, the customer's credit limit, the customer's average credit balance, or other criteria. For example, a customer with a high credit limit might receive a sales presentation for a wider range of financial-services products, including life insurance.

(5) An automated sales presentation begins which informs the customer that he will receive $2 for each question he answers correctly. This provides the customer with an incentive to listen carefully so as to answer the questions correctly. The customer is given a second chance to answer any question he answered incorrectly.

(6) The customer is also notified that he can receive the full $10 credit without answering any questions when he agrees to accept $10,000 of free life insurance for 60 days. After 60 days, he will have the option to continue or cancel the insurance.

(7) The presentation continues with the customer periodically being asked questions. The questions may be of several different forms. For example, the customer may be asked a multiple choice question (such as "Press 1 to hear about credit card life insurance, 2 for whole life insurance"), or a free response question (such as "Enter the number of children that you have"). The topic of the questions may relate to the sales presentation itself (such as "What is the most important reason to have life insurance?"), or to the customer's personal characteristics (such as "How much life insurance do you currently have? Under $10,000, press 1; $10,000 to $25,000, press 2," etc.).

(8) The script branches to address the choices and personal characteristics entered by the customer. The script also branches in the case of an incorrect answer by the customer, to give him a second chance to answer the question correctly.

(9) The customer database is updated during the sales presentation to reflect the accumulated $2 credits. The customer is reminded during the sales presentation of the amount he has earned so far. The customer is also told that he will lose all of his earnings if he hangs up before the presentation is finished. This provides an incentive for the customer to continue listening.

(10) Throughout the sales presentation, the customer can press a key on his telephone keypad to indicate his acceptance of the 60-day credit card life insurance offer. This entitles him to the full $10 advertised credit.

In an alternative embodiment of the invention, the sales presentation does not include an offer to sell, but instead asks the customer to agree to attend an in-person sales event, or to allow a follow-up telephone call from a live telemarketing agent. When the customer signals his agreement, the advertised credit is immediately added to his credit card account.

In another alternative embodiment of the invention, the sales presentation is automated (that is, the customer listens to a prerecorded script), but the central controller signals a live agent to speak with the customer at some point during the sales presentation (for example, before the last question). This gives the agent an opportunity to ask follow-up questions, thereby enhancing the likelihood of a sale. The system may also be designed so that a live agent is signaled to speak with the customer based on a particular pattern of customer responses to the questions (for example, if the customer indicates that he does not presently have life insurance, but believes it is important to have life insurance).

In the foregoing example, the customer was awarded a credit for a correct answer to a question. Of course, credits need not only be given for correct answers, but may be given at various times during the sales presentation. The customer may be reminded of his "earnings" so far as in the above example, to motivate him to continue listening.

The embodiments described above involve a customer with an established credit card account. However, the present invention is applicable to any situation wherein a customer has an account which can be credited while he interacts with the central controller. For example, the invention may be used by (or under an agreement with) the customer's telephone service provider, with the awards for listening to the sales presentation being credited to the customer's telephone bill.

The embodiments described above involve communication between the customer and the central controller by telephone, with the sales presentation being delivered as an audio telephone message. The present invention is also applicable to situations where the customer and central controller communicate by other means, such as online computing. For example, the customer might dial into an Internet site to open a channel of communication (either text-based or audio) with the central controller 201. In this instance, the customer's personal computer would take the place of the telephone, and a modem would likewise take the place of the IVRU. Other necessary modifications to the system depicted in FIG. 2 will be apparent to those skilled in the art of interactive online computing.

In the preferred embodiment described above, the customer makes the telephone call to the telemarketer (the incoming call 200). However, the present invention is also applicable to outgoing calls placed by the telemarketer.

An alternate embodiment of the invention uses a live operator or a recording to initiate contact with the customer. The customer listens to the beginning of the sales presentation as described above. For example, when the customer answers his telephone he hears: "Hello, this is a call from (name of bank); if you'll listen to a 6-minute recorded presentation on credit card life insurance, we'll give you up to $10 as an immediate credit on your bank credit card." As the recorded sales presentation continues, the customer may answer questions and/or accept the offer in the same manner as described above.

The present invention is also applicable to a game of skill, wherein the customer places a call (perhaps with a per-minute charge) to the central controller and answers questions, being instantly rewarded with credits on his credit card account as prize money for correct answers.

There has thus been provided a new and improved method and system of communicating information which has particular application to the field of telemarketing. In accordance with one described embodiment of the invention, the system performs in an automated manner, offering information and real-time awards selected to ensure customer attention and interest. Customers are first identified based on known information used to select those most likely to have an interest both in the presentation materials and the rewards.

The method and system of the present invention are flexible, with both the information and the reward being adaptable based on customer feedback to solicit the optimum interest and attention of the customer. Feedback from the customer can be required, thereby confirming ongoing attention to the information being provided. The real-time reward can constitute an actual transfer of monetary value to the customer's credit card, initiated as the information is presented. Further, an automated practice is provided for accelerating the reward plus the termination of the communication if the customer should indicate an acceptance of an offered product.

While the present invention has been described above in terms of specific embodiments, it is to he understood that the invention is not limited to the disclosed embodiments. On the contrary, the present invention is intended to cover various modifications and equivalent structures included within the spirit and scope of the appended claims.

We claim:

1. A system for communicating information to a consumer, comprising:
   means for communicating to the consumer an invitation to receive a sales presentation in exchange for a value;
   a controller including a processor adapted to arrange for the sales presentation to be delivered to the consumer in response to the consumer accepting the invitation; and
   an apparatus, operatively connected to said controller, configured to communicate the sales presentation to the consumer,
   wherein said controller is further adapted to initiate a transfer of the value to the consumer in response to the consumer receiving the sales presentation, and wherein said controller is further adapted to select a credit card identification and transaction data from a database, the credit card identification and transaction data being associated with the consumer.

2. The system according to claim 1, wherein the invitation comprises a telephone number, instructions to complete a telephone call to said telephone number and information regarding the value, and wherein the sales presentation comprises audio information delivered during the telephone call.

3. The system according to claim 1, wherein said means for communicating the invitation comprises a credit card billing statement.

4. The system according to claim 1, wherein the program is adapted to initiate the transfer of the value to the consumer by crediting a credit card account of the consumer with a particular monetary value.

5. The system according to claim 1, wherein the sales presentation includes a question directed to the consumer, and said apparatus communicates to said controller an answer to the question.

6. The system according to claim 5, wherein the value depends upon the answer.

7. The system according to claim 5, wherein the processor selects an additional sales presentation in accordance with the answer.

8. The system according to claim 1, wherein the processor selects a consumer name from the database.

9. The system according to claim 1, further comprising:
   means for selecting the sales presentation in accordance with at least one of the credit card identification, transaction data and an associated consumer name.

10. The system according to claim 1, further comprising:
    means for selecting the consumer to whom the invitation is communicated in accordance with at least one of the sales presentation, the value, the credit card identification and transaction data.

11. The system according to claim 1, wherein the sales presentation comprises a request for a response.

12. The system according to claim 11, wherein the value depends upon the response.

13. The system according to claim 12, wherein the sales presentation comprises an offer to sell to the consumer, and the program is adapted to initiate the transfer of the value when the response indicates an acceptance of the offer.

14. The system according to claim 1, further comprising means for placing a telephone call to the consumer, wherein the sales presentation comprises audio information delivered during the telephone call.

15. A system for communicating information to a consumer, comprising:
    means for communicating to the consumer an invitation to receive a sales presentation in exchange for a value;
    a controller including a processor and at least one memory device storing:
        customer data comprising credit card identification indicia and associated transaction data in a plurality of customer information fields,
        sales presentation data comprising a plurality of sales presentation identification indicia and a sales presentation associated with each of said plurality of indicia, and
        a program, adapted to be executed by the processor, for selecting a credit card identification and associated transaction data from said customer data, and for selecting a particular sales presentation from the sales presentation data, in accordance with at least one of the selected credit card identification indicia and the associated transaction data; and
    an apparatus, operatively connected to the processor and controlled by the processor, for communicating the sales presentation to the consumer in response to the consumer accepting the invitation,
    wherein the program is further adapted to initiate a transfer of the value to the consumer in response to the consumer receiving the sales presentation, and to add the sales presentation identification indicia for the selected sales presentation to the field associated with the credit card identification indicia.

16. A method for communicating information to a consumer, comprising:
    selecting a credit card identification and transaction data from a database, the credit card identification and transaction data being associated with the consumer;
    communicating to the consumer an invitation to receive a sales presentation in exchange for a value;
    delivering the sales presentation to the consumer by having a processor in a controller execute a program to arrange for the sales presentation to be delivered to the consumer in response to the consumer accepting the invitation; and
    initiating a transfer of the value to the consumer in response to the consumer receiving the sales presentation.

17. The method according to claim 16, wherein the invitation comprises a telephone number, instructions to complete a telephone call to said telephone number, information regarding the value, and wherein the sales presentation comprises a voice message delivered during the telephone call.

18. The method according to claim 16, wherein said communicating comprises mailing the invitation with a credit card billing statement.

19. The method according to claim 16, wherein said initiating comprises crediting a credit card account of the consumer with a particular monetary value.

20. The method according to claim 16, wherein said delivering comprises delivering a question directed to the consumer in the course of the sales presentation, and further comprising:
receiving from the consumer an answer to the question.

21. The method according to claim 20, wherein the value depends upon the answer.

22. The method according to claim 20, further comprising:
selecting an additional sales presentation in accordance with the answer.

23. The method according to claim 16, further comprising:
selecting an associated consumer name from the database.

24. The method according to claim 16, further comprising:
selecting the sales presentation in accordance with at least one of the credit card information, the transaction data, and an associated consumer name.

25. The method according to claim 16, further comprising:
selecting the consumer to whom the invitation is communicated in accordance with at least one of the sales presentation, the value, the credit card identification, and transaction data.

26. The method according to claim 16, further comprising:
delivering to the consumer a request for a response; and receiving the response from the consumer.

27. The method according to claim 26, wherein the value depends upon the response.

28. The method according to claim 27, wherein said delivering further comprises:
delivering an offer to sell to the consumer, wherein said transferring transfers the value when the response indicates an acceptance of the offer.

29. The method according to claim 16, further comprising:
placing a telephone call to the consumer, wherein the sales presentation comprises audio information delivered during the telephone call.

30. A method for communicating information to a consumer, comprising:
communicating to the consumer an invitation to receive a sales presentation in exchange for a value;
selecting a credit card identification and transaction data, the credit card identification and transaction data being associated with the consumer in a consumer information database;
selecting a particular sales presentation to be communicated to the consumer from sales presentation data in accordance with at least one of the selected credit card identification and transaction data, wherein the sales presentation data comprises a plurality of sales presentation identification indicia and the sales presentation associated with each of said plurality of indicia;
communicating the sales presentation to the consumer in response to the consumer accepting the invitation;
initiating a transfer of the value to the consumer in response to the consumer receiving the sales presentation; and
adding the sales presentation identification indicia for the selected sales presentation to the consumer information database in association with the consumer.

31. A system for communicating information to a consumer, comprising:
means for communicating to the consumer an invitation to receive a sales presentation in exchange for an incentive value, the sales presentation including an offer to sell to the consumer;
a controller including a processor adapted to arrange for the sales presentation to be delivered to the consumer in response to the consumer accepting the invitation; and
an apparatus, operatively connected to said controller, configured to communicate the sales presentation to the consumer,
wherein the processor is further adapted to initiate a transfer of the incentive value to the consumer in response to the consumer receiving the sales presentation and initiate a transfer to the consumer of a bonus value in response to the consumer accepting the offer.

32. The system according to claim 31, wherein the sales presentation comprises a series of presentations each having an associated incentive value, and the bonus value comprises an amount such that the consumer receives an amount larger than a sum of the incentive values associated with the sales presentation.

33. A method for communicating information to a consumer, comprising:
communicating to the consumer an invitation to receive a sales presentation in exchange for an incentive value, the sales presentation including an offer to sell a product;
delivering the sales presentation to the consumer by having a processor in a controller execute a program for delivering the sales presentation to the consumer, said delivering being performed via an apparatus in response to the consumer accepting the invitation;
initiating a transfer of the incentive value to the consumer in response to the consumer receiving the sales presentation; and
concluding delivery of the sales presentation in response to the consumer accepting the offer; and
initiating a transfer to the consumer of a bonus value in response to the consumer accepting the offer.

34. The method according to claim 33, wherein the sales presentation comprises a series of presentations each having an associated incentive value, and the bonus value comprises an amount such that the consumer receives an amount larger than a sum of the incentive values associated with the sales presentation.

35. A method for communicating information to a consumer, comprising:
selecting a consumer based on at least one of (i) a credit card identification and (ii) transaction data associated with the consumer;
communicating to the consumer an invitation to receive a sales presentation in exchange for a value;
communicating to the consumer the sales presentation in response to the consumer accepting the invitation; and
initiating a transfer of the value to the consumer in response to the consumer receiving the sales presentation.

36. An apparatus, comprising:
a processor; and
a storage device coupled to said processor and storing instructions adapted to be executed by said processor to:
  selecting a consumer based on at least one of (i) a credit card identification and (ii) transaction data associated with a consumer;
  communicate to the consumer an invitation to receive a sales presentation in exchange for a value;
  communicate to the consumer the sales presentation in response to the consumer accepting the invitation; and
  initiate a transfer of the value to the consumer in response to the consumer receiving the sales presentation.

37. A medium storing instructions adapted to be executed by a processor to perform a method for communicating information to a consumer, said method comprising:
  selecting a consumer based on at least one of (i) a credit card identification and (ii) transaction data associated with the consumer;
  communicating to the consumer an invitation to receive a sales presentation in exchange for a value;
  communicating to the consumer the sales presentation in response to the consumer accepting the invitation; and
  initiating a transfer of the value to the consumer in response to the consumer receiving the sales presentation.

38. A method for communicating information to a consumer, comprising:
  selecting a consumer based on at least one of (i) a credit card identification and (ii) transaction data associated with the consumer from a database;
  communicating to the consumer an invitation to receive a sales presentation in exchange for a value;
  selecting a sales presentation to be communicated to the consumer based on at least one of (i) the credit card identification and (ii) transaction data;
  communicating to the consumer the selected sales presentation in response to the consumer accepting the invitation;
  initiating a transfer of the value to the consumer in response to the consumer receiving the selected sales presentation; and
  adding information associated with the selected sales presentation to the database.

39. An apparatus, comprising:
a processor; and
a storage device coupled to said processor and storing instructions adapted to be executed by said processor to:
  select a consumer based on at least one of (i) a credit card identification and (ii) transaction data associated with the consumer from a database;
  communicate to the consumer an invitation to receive a sales presentation in exchange for a value;
  select a sales presentation to be communicated to the consumer based on at least one of the (i) credit card identification and (ii) transaction data;
  communicate to the consumer the selected sales presentation in response to the consumer accepting the invitation;
  initiate a transfer of the value to the consumer in response to the consumer receiving the selected sales presentation; and
  add information associated with the selected sales presentation to the database.

40. A medium storing instructions adapted to be executed by a processor to perform a method for communicating information to a consumer, said method comprising:
  selecting a consumer based on at least one of (i) a credit card identification and (ii) transaction data associated with the consumer from a database;
  communicating to the consumer an invitation to receive a sales presentation in exchange for a value;
  selecting a sales presentation to be communicated to the consumer based on at least one of the (i) credit card identification and (ii) transaction data;
  communicating to the consumer the selected sales presentation in response to the consumer accepting the invitation;
  initiating a transfer of the value to the consumer in response to the consumer receiving the selected sales presentation; and
  adding information associated with the selected sales presentation to the database.

41. A method for communicating information to a consumer, comprising:
  communicating to the consumer an invitation to receive a sales presentation in exchange for an incentive value, the sales presentation including an offer;
  delivering the sales presentation to the consumer in response to the consumer accepting the invitation;
  initiating a transfer to the consumer of the incentive value in response to the consumer receiving the sales presentation; and
  initiating a transfer to the consumer of a bonus value in response to the consumer accepting the offer.

42. An apparatus, comprising:
a processor; and
a storage device coupled to said processor and storing instructions adapted to be executed by said processor to:
  communicate to a consumer an invitation to receive a sales presentation in exchange for an incentive value, the sales presentation including an offer;
  deliver the sales presentation to the consumer in response to the consumer accepting the invitation;
  initiate a transfer to the consumer of the incentive value in response to the consumer receiving the sales presentation; and
  initiate a transfer to the consumer of a bonus value larger than the incentive value in response to the consumer accepting the offer.

43. A medium storing instructions adapted to be executed by a processor to perform a method for communicating information to a consumer, said method comprising:
  communicating to the consumer an invitation to receive a sales presentation in exchange for an incentive value, the sales presentation including an offer;
  delivering the sales presentation to the consumer in response to the consumer accepting the invitation;
  initiating a transfer to the consumer of the incentive value in response to the consumer receiving the sales presentation; and
  initiating a transfer to the consumer of a bonus value in response to the consumer accepting the offer.

44. A method for communicating information to a remotely located customer, comprising:

selecting a remotely located customer based on at least one of (i) a credit card identification and (ii) transaction data associated with the consumer from a database;

communicating to the remotely located consumer an invitation to receive a sales presentation in exchange for a value;

delivering the sales presentation to the consumer, the sales presentation including a request for a response;

receiving the response from the consumer; and initiating a transfer of the value to the consumer based on the received response.

45. The method of claim 44, wherein the sales presentation is a telemarketing presentation and said delivering is performed via a telephone call.

46. The method of claim 44, wherein the request for a response comprises a question and the received response comprises an answer to the question.

47. The method of claim 44, further comprising:

receiving from the consumer identifying information; and searching a database in accordance with the identifying information to select the sales presentation to be delivered to the consumer.

48. The method of claim 44, further comprising:

evaluating the response, wherein the value is based on said evaluation.

* * * * *